United States Patent

Majerowicz et al.

[11] Patent Number: 5,293,960
[45] Date of Patent: Mar. 15, 1994

[54] BUTTON LUBRICATOR

[76] Inventors: Frank G. Majerowicz, 667 Budleigh Cir., Timonium, Md. 21093; Lloyd H. Shue, 633 Buckland Pl., Bel Air, Md. 21014

[21] Appl. No.: 953,010
[22] Filed: Sep. 29, 1992
[51] Int. Cl.⁵ .............................................. F01M 1/00
[52] U.S. Cl. .................................. 184/13.1; 184/88.1; 184/88.2; 184/102; 184/109
[58] Field of Search ............... 184/105.2, 109, 6.9, 184/28, 38.1, 38.3, 88.1, 88.2, 89, 105.3, 13.1; 220/229; 251/319

[56] References Cited

U.S. PATENT DOCUMENTS

| 2,436,291 | 2/1948 | Daniel | 220/229 |
| 2,847,880 | 6/1953 | Neidig | 184/15.1 |
| 3,847,490 | 11/1974 | Uchida | 184/109 |
| 4,481,122 | 11/1984 | Root et al. | 252/49.6 |
| 5,152,908 | 10/1992 | Tipton | 252/18 |

FOREIGN PATENT DOCUMENTS 2626612  1/1977  Fed. Rep. of Germany ...... 251/319

Primary Examiner—Thomas E. Denion
Attorney, Agent, or Firm—Walter G. Finch

[57] ABSTRACT

A button lubricator applicator system is provided. It consists of a closed structure defining a closed end cylindrical housing having a removable open or lid end, with amine and organo-silicone positioned in the cylindrical housing, together with an air water valve of selected and predetermined shape positioned in the removable open end. The air water valve is depressed in the applicator in contact with the silicone material in order to lubricate it.

3 Claims, 1 Drawing Sheet

BUTTON LUBRICATOR

BACKGROUND AND SUMMARY OF THE INVENTION

This invention relates to lubricating devices, and more particularly to button type lubricators for endoscopes that have air/water and/or suction valves (buttons) for use in colonoscopes, gastroscopes, sigmoidoscopes and DuoDenom.

It is an object of this invention to provide a novel applicator device forendoscopes that have air-water valves buttons which are to be efficiently lubricated.

Still another object of this invention is to provide an air-water or button type valve which can be inserted into an access aperture or hole provided in the top of an applicator.

BRIEF DESCRIPTION OF THE DRAWINGS

These and other objects and attendant advantages of this invention will become more obvious from the accompanying drawings and detailed description in which.

DESCRIPTION OF THE PREFERRED EMBODIMENTS

Figure 1:
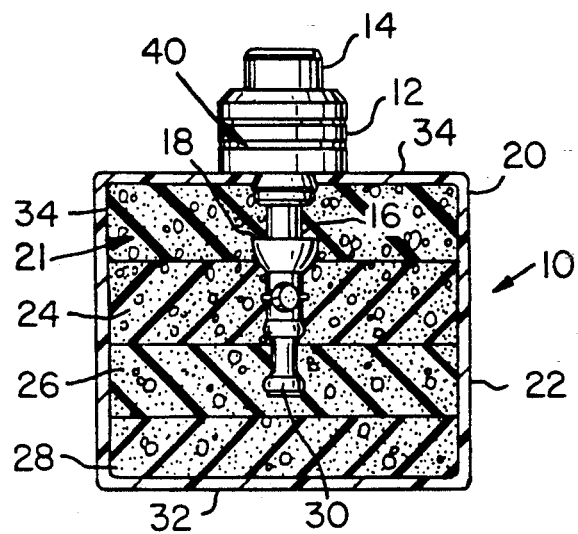
FIG. 1 is a side view, partially in cross section of a button lubricator system.

Referring now to FIG. 1, there is illustrated an applicator 10 consisting of a cylindrical can 22 having an air/water button 40 in the center and which passes through a lid 20. The air/water button 40 is simply an elongated valve device capable of withdrawing liquid lubricant. This is often accomplished by means of suction. Hence, for purposes of this application, the air/water button 40 or air/water button valve 40 may also be referred to as a suction valve.

The applicator 10 is filled with silicone material 24, 26 and 21. The inside of the lid 20 has an upper surface 34 and is filled with silicone. (Dow Corning 360 Medical Fluid). This is also known as uniform 1.80C polyurathane foam material. This foam material is a flexible, resilient solid, and is essentially odorless.

The foam material contains tertiary amine and organo-silicone ingredients which are present at less than 1% of the composition and, therefore, in accordance with 29 CPR 1910, 1200, Section (g) are not subject to listing as health hazards.

Figure 2:
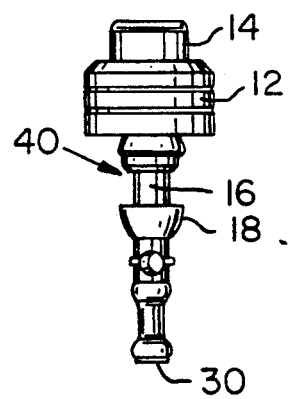
FIG. 2 is a side view of a air water valve of an endoscope.
Figure 3:
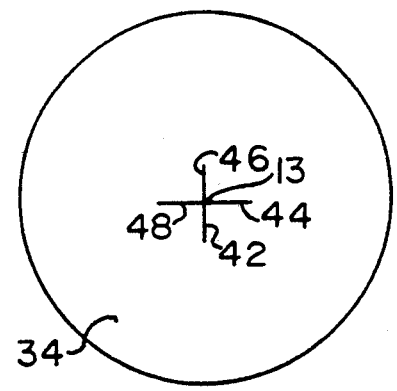
FIG. 3 is a top view of the applicator.

Referring now to FIGS. 1, 2 and 3, there is shown the air water valve 14 which consists of a cylindrical portion 12, a reduced middle portion 16, a frusto-conical portion 18 and a frusto-conical portion 30. Different type air-water valves or equivalent can be used.

A button lubricator 10 is a device that applies silicone lubricant to the air/water and/or suction valve on a flexible endoscope. Button lubricators must therefore be constructed n such a manner to facilitate quick and efficient lubrication of the button valves 40 in the endoscope devices. These valves must be lubricated at all times to keep them from sticking during an endoscopy procedure.

In operational use, the air/water or button valve 40 to be cleaned and disinfected is first removed from the endoscope device in which it is positioned. This accomplished by either unscrewing or unclamping the air/water button 40, however it may be attached. The button 40 is then introduced into an access opening 13, shown best in FIG. 3, in the top of the applicator 10 through four right angle slits 42, 44, 46 and 48, forming four flaps. The lid portion 34 of the applicator 10, constructed from a rubber or plastic material, is sufficiently rigid to support the button valve 40 as it receives the pressure required to depress the valve 14 during insertion in the applicator 10. This allows the end of the air water valve 14 to pass therethrough into the interior of the applicator 10. The air water valve 14 is then pressed down one or two times to withdraw the lubrication that is, the silicone in the applicator 10.

It is to be noted that silicone oil is to be applied as needed so that the air water valve 14 is lightly coated with silicone oil after it has been pushed down 1 or 2 times.

The air water valve 14 is removed, and it is now ready to be installed into an endoscope.

The following endoscopes have air/water and/or suction valves (buttons), namely colonoscopes, gastroscopes, sigmoidoscopes, DuoDenom and Bronchoscopes.

Obviously, many modifications and variations of the present invention are possible in light of the above teachings. It is, therefore, to be understood that within the scope of the appended claims, the invention may be practiced otherwise than as specifically described.

What is claimed is:

1. A button lubricator system, comprising, a closed structure defining a closed end cylindrical housing having a removable open end and forming an upright body of the button lubricator, amine and organo-silicone in said cylindrical housing, and an elongated button valve mechanism disposed in said removable open end, wherein said button valve mechanism has a round, depressable upper portion and a narrow lower portion, and whereby said removable open end of said cylindrical housing is made from a rigid rubber material.

2. A button lubricator applicator system as recited in claim 1, wherein said amine and organo-silicone forms a polyurathane foam material in said cylindrical housing.

3. A button lubricator applicator system as recited in claim 1, wherein said amine and organo-silicone material forms a silicone material in said cylindrical housing.

* * * * *